UNITED STATES PATENT OFFICE.

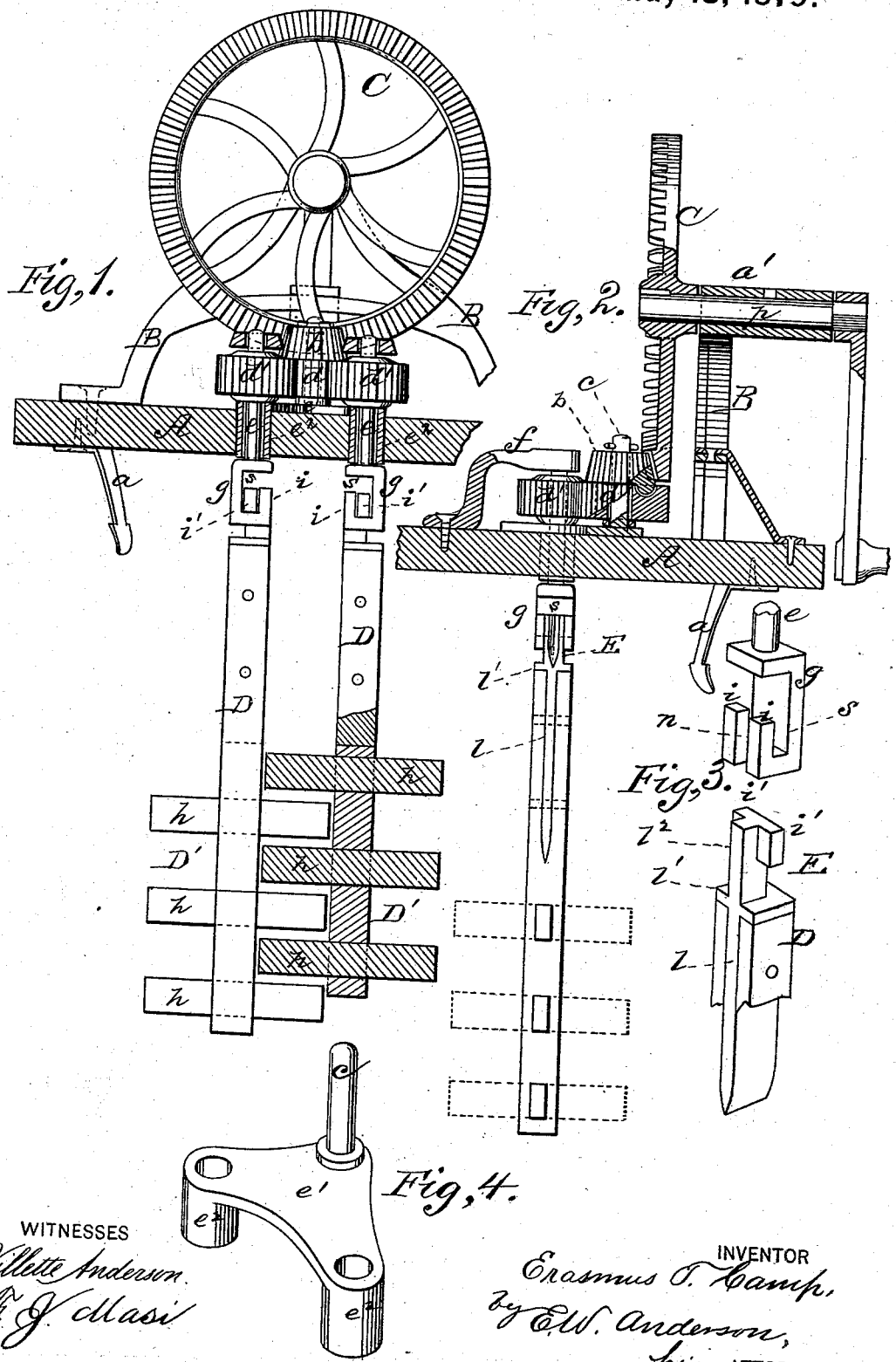

ERASMUS T. CAMP, OF EDWARDSVILLE, ALABAMA.

IMPROVEMENT IN CHURNS.

Specification forming part of Letters Patent No. 215,319, dated May 13, 1879; application filed March 20, 1879.

*To all whom it may concern:*

Be it known that I, ERASMUS T. CAMP, of Edwardsville, in the county of Cleburne and State of Alabama, have invented a new and valuable Improvement in Churning-Machines; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of sectional views of my improved churning-machine, and Figs. 3 and 4 are details.

This invention has relation to improvements in churns; and the nature of the invention consists in a certain novel arrangement of the churn-dash and of its operative devices, as will be hereinafter more fully set forth.

In the annexed drawings, the letter A designates the preferably wooden lid of a churn having on its under side the spring-arms $a$. These are rigidly secured to the lid, and when sprung into the cream-vessel hold the former on the latter by their reaction; or the same result may be had by forcing the lid upon the vessel with the spring-arms bearing upon its outside.

B indicates a cast-metal upright erected upon the top of the lid, and having at its upper end an elongated sleeve, $a'$, that affords a bearing to the spindle $p$ of a beveled-gear wheel, C. This wheel engages a correspondingly-beveled pinion, $b$, secured upon a short shaft, $c$, that is provided below said pinion with an ordinary gear-wheel, $d$. This meshes into similar gear-wheels $d'$, keyed upon shafts $e$, extending from below through the lid, and having removably secured to their lower ends the dash-rods D and dashers D′.

The shaft $c$, on which are the pinion $b$ and gear $d$, projects upward from a metallic plate, $e^1$, secured to the lid, and provided with tubular sleeves $e^2$, extending through the lid and affording bearings to the shafts $e$. The upper ends of these shafts are journaled in an overhanging standard, $f$, secured to the lid. The lower ends of the shafts $e$ are of enlarged square form, and are provided each with an angular open-ended slot, $s$, of the form used in a bayonet-catch. These open through the side of the enlargements $g$ near their upper ends, and extend down a sufficient distance. In the end of each of these enlargements is a notch, $n$, opening into the notch or slot $s$, and forming the hooks $i$.

The dasher-rods D are provided with a deep notch in their upper end, in which is received the tang of a metallic coupling device, E. This consists of a tang, $l$, a collar, $l^1$, and a rectangular reduced arm, $l^2$, projecting from the said collar, and provided at its free end with the wings $i'$. This arm is readily received in the notch $n$, and the wings readily enter the open-ended horizontal branch of slot $s$; being pushed into which they enter the vertical branch of the same and descend to its lower end, the said wings being engaged with the hooks $i$. The dasher-rods are thus secured removably to the shafts and rotate therewith. The dasher-rods are some distance apart and parallel, and the dashers D′ are formed by passing preferably wooden rectangular blades $h$ through slots in the said rods, as shown.

The blades are so arranged that those on one rod pass between the interspaces of those on the other without the said blades interfering with each other or with the dasher-rods. By this means the cream in the vessel is subjected to a very violent agitation and butter is speedily made to come.

The lid, with its spring-holders and working parts, is applicable to every variety of churn wherein a stationary vessel is used, and the dash-rods, being readily removable from the shaft ends, may be easily and expeditiously cleaned when required.

What I claim as new, and desire to secure by Letters Patent, is—

1. The metallic plate $e^1$, provided with an upright spindle, $c$, and tubular sleeves $e^2$, a gear, $d$, and beveled gear $b$, secured on said spindle, a beveled driving-wheel, C, engaging the gear $b$, the shafts $e$, extending upward through sleeves $e^2$, the gear-wheels $d'$ on shafts $e$, engaging gear $d$, and the dash-rods D, removably secured to the shafts $e$, all combined and operating as set forth.

2. The combination, with the dasher-rod D, having the reduced arm $l^2$, provided with wings $i'$, of the shaft $e$, having the enlargement $g$, provided with the angular slot $s$ and a notch, $n$, forming hooks $i$, substantially as specified.

In testimony that I claim the above I have hereunto subscribed my name in the presence of two witnesses.

ERASMUS T. CAMP.

Witnesses:
WILLIAM B. FERGUSON,
WILLIAM T. NOELL.